United States Patent [19]

Spain et al.

[11] Patent Number: 4,499,216

[45] Date of Patent: Feb. 12, 1985

[54] METHOD AND RESIN SOLUTION FOR SPLICING CARBONIZED POLYACRYLONITRILE MATERIAL

[75] Inventors: Raymond G. Spain, Huntington Beach; James E. Massie, Westminster, both of Calif.

[73] Assignee: Hitco, Newport Beach, Calif.

[21] Appl. No.: 510,673

[22] Filed: Jul. 5, 1983

[51] Int. Cl.³ .................... C08K 5/02; C08L 63/10
[52] U.S. Cl. .................... 523/437; 156/157; 156/158; 156/159; 156/330; 523/400; 525/119
[58] Field of Search .............. 156/157, 158, 159, 330; 523/400, 437; 525/119

[56] References Cited

U.S. PATENT DOCUMENTS

| | | | |
|---|---|---|---|
| 3,259,534 | 7/1966 | Wicker et al. | 156/330 |
| 3,505,269 | 4/1970 | Jeffery et al. | 525/119 |
| 3,509,086 | 4/1970 | Rohrbacher | 525/119 |
| 3,673,275 | 6/1972 | Simms | 525/119 |
| 3,684,617 | 8/1972 | Windecker | 156/330 |
| 3,943,187 | 3/1976 | Wu | 525/119 |
| 4,379,885 | 4/1983 | Miller et al. | 523/437 |

FOREIGN PATENT DOCUMENTS 54-105175  8/1979  Japan .................. 156/330

OTHER PUBLICATIONS

Ind. & Engineering Chem., vol. 53, No. 6, Jun. 1961, pp. 463–465.

*Primary Examiner*—Ronald W. Griffin
*Attorney, Agent, or Firm*—Fraser and Bogucki

[57] ABSTRACT

A method is provided for splicing carbonized PAN tows in which the tows to be spliced are cut square and coated at the ends thereof with a resin solution, following which the coated ends are joined together, heated so as to cure the resin solution and then pinched to compact the resulting splice. The resin solution is comprised of a mixture of a solid acrylic polymer, a liquid acrylic polymer, a solid epoxy resin and a solvent.

4 Claims, 4 Drawing Figures

METHOD AND RESIN SOLUTION FOR SPLICING CARBONIZED POLYACRYLONITRILE MATERIAL

BACKGROUND OF THE INVENTION

1. Field of the Invention

The present invention relates to methods and materials for splicing or otherwise joining together carbonaceous materials, and more particularly to methods and apparatus for splicing carbonized polyacrylonitrile tows.

2. History of the Prior Art

During the manufacture of carbon fibers from polyacrylonitrile (PAN) precursor material, it is frequently necessary or desirable that tows of the polyacrylonitrile precursor material which have been oxidized and then carbonized be spliced or otherwise joined together. Splicing may be necessary, for example, where a plurality of the carbonized tows are simultaneously handled such as by winding on creels or bobbins. If one or more of the tows are shorter in length than the others, then splicing of the shorter lengths of tow to other lengths of tow becomes necessary so as not to interrupt the simultaneous winding or other processing of the tows. Splicing of carbonized tows may also be necessary where a continuous length of tow of specified length or poundage is to be provided. In such instances the processed length of tow may be too short so that one or more additional lengths of tow must be spliced thereto.

Carbonized PAN tows have a relatively hard composition and are of limited flexibility. Consequently, it is very difficult to join together two lengths of such tows by knotting or tying. However, even if knotting or tying were otherwise feasible, the equipment used to handle and process the tows typically advances the tows through eyelets and around sharp turns so as to prevent the use of tying or knotting.

In some instances carbonized PAN tows have been spliced together using an adhesive such as dissolved plexiglass. Such adhesives have been found to provide a splice which is relatively bulky and which in any event is too stiff to permit the tows and included splice to easily negotiate the sharp turns and eyelets within the processing equipment.

A satisfactory splice of two tows of carbonized PAN must be relatively strong and at the same time sufficiently flexible and compact so that the splice may readily negotiate the eyelets, sharp turns and other obstacles present in the equipment used to process such tows. These objects must be accomplished in the face of the carbonized tows which are themselves relatively stiff and inflexible and have relatively hard and smooth surfaces so as to resist adhesive penetration and bonding.

BRIEF DESCRIPTION OF THE INVENTION

These and other objects are accomplished in accordance with the invention by an improved method of splicing which is preferably utilized in conjunction with an improved splicing adhesive in the form of a resin solution. In methods of splicing according to the invention the ends of a pair of lengths of carbonized PAN tow to be spliced are first cut square and are then coated with a resin solution such as by dipping the ends in the solution. The coated ends are then joined together, and while in this position are heated at a sufficient temperature and for a sufficient time to evaporate solvent within the resin solution and cure the resin solution. The resulting splice is then pinched together so as to smooth and compact the splice.

A preferred form of resin solution in accordance with the invention is comprised of an acrylic polymer, an epoxy resin and a solvent. In one example thereof, the acrylic polymer is made up of a solid acrylic polymer having a high molecular weight on the order of about 260,000 and a liquid acrylic polymer having a much lower molecular weight on the order of about 7000. The solid epoxy resin comprises the tetraglycidyl ether of tetraphenylethane, and the solvent comprises methylene chloride. In such example, the resin solution is comprised of approximately 47.8 parts by weight of the solid acrylic polymer, approximately 37.2 parts by weight of the liquid acrylic polymer, approximately 15.0 parts by weight of the solid epoxy resin and approximately 900 parts by weight of the solvent.

BRIEF DESCRIPTION OF THE DRAWINGS

The foregoing and other objects, features and advantages of the invention will be apparent from the following more particular description of a preferred embodiment of the invention, as illustrated in the accompanying drawings, in which.

DETAILED DESCRIPTION

Figure 1:
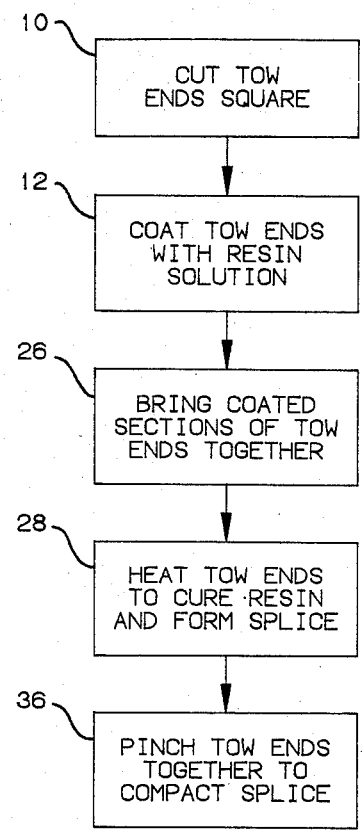
FIG. 1 is a block diagram of the successive steps in a preferred method of splicing carbonized polyacrylonitrile material in accordance with the invention.

FIG. 1 depicts a preferred method of splicing together carbonized polyacrylonitrile (PAN) material in accordance with the invention. The method of FIG. 1 is described in connection with the splicing of two tows of carbonized PAN.

In a first step 10 shown in FIG. 1 the ends of two lengths of tow to be spliced together are cut square. This is accomplished by cutting each tow end through a plane which is generally normal to the central axis of the two to insure a relatively square end in preparation for splicing.

In a second step 12 illustrated in FIG. 1 the end of each of the two tows to be spliced together is coated with a resin solution. This may be accomplished by dipping each of the tow ends into the resin solution a desired distance such as ¾".

Figure 2:
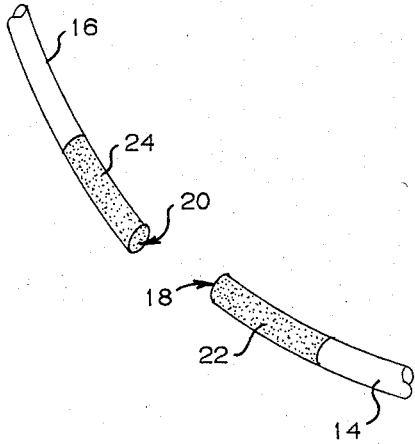
FIG. 2 is a perspective view of the ends of two tows of carbonized polyacrylonitrile material which have been cut and coated with a resin solution in accordance with the method of FIG. 1.

FIG. 2 depicts two different lengths 14 and 16 of carbonized PAN tow. The lengths 14 and 16 have ends 18 and 20 respectively which have been cut square pursuant to the first step 10 of FIG. 2. The ends 18 and 20 have coatings 22 and 24 respectively of the resin solution as a result of the second step 12 of FIG. 1.

In a third step 26 of FIG. 1 the coated portions of the tow lengths 14 and 16 are brought together. This means that the tow length 14 is disposed relative to the tow length 16 such that the lengths 14 and 16 overlap with the coatings 22 and 24 being generally coextensive.

Figure 3:
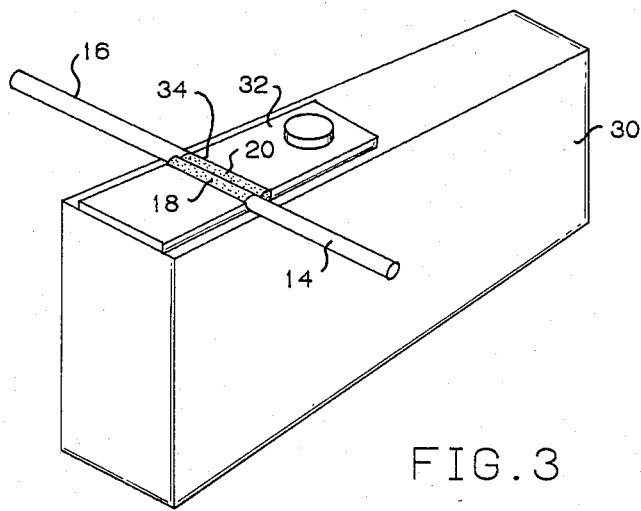
FIG. 3 is a perspective view of a heating mandrel showing the manner in which the coated tow ends of FIG. 2 are brought together and heated to cure the resin and form the splice.

The step 26 and a following step 28 in the method of FIG. 1 can be accomplished in conjunction with a heating mandrel 30 shown in FIG. 3. The heating mandrel 30 has a metal plate 32 mounted on the top thereof and containing a slot 34 therein across the width thereof. The two lengths 14 and 16 are disposed such that the coated portions of the ends 18 and 20 thereof are overlapped within the slot 34 so as to accomplish the step 26 in the method of FIG. 1. In the next step 28 the overlapping tow ends 18 and 20 are heated to cure the resin and form a splice. The heating mandrel 30 contains heating coils (not shown) which are energized to provide a controlled amount of heat to the plate 32 at the top of the mandrel 30 and the included tow ends 18 and 20. In the present example the tow lengths 14 and 16 are held by hand in the positions shown in FIG. 3 for 30–60 seconds in the presence of a temperature within the slot 34 of approximately 450° F. This temperature and residence time range have proven adequate to substantially cure the resin and form the splice using a resin solution as described hereafter.

In a fifth and final step 36 of FIG. 1 the formed splice is removed from the slot 34 within the plate 32 at the top of the heating mandrel 30 and the joined ends 18 and 20 of the tow lengths 14 and 16 are pinched together either by hand or using an appropriate instrument so as to compact the splice.

Figure 4:
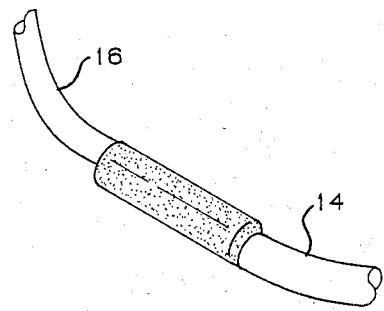
FIG. 4 is a perspective view of the completed splice after the tow ends have been pinched together for compacting in accordance with the method of FIG. 1.

The resulting splice which is shown in FIG. 4 has been found to have adequate strength and flexibility for further processing of the tow lengths 14 and 16. At the same time the splice itself is relatively compact and is relatively freely drawn through eyelets and over relatively sharp edges in the processing equipment.

In accordance with the invention the resin solution used in the method of FIG. 1 is preferably comprised of an acrylic polymer, an epoxy resin and a solvent. Such mixture when made in the right proportions results in splices of adequate strength and flexibility despite the limited flexibility of carbonized PAN tows and the difficulty in penetrating and bonding to the relatively hard material that characterizes such tows. At the same time the acrylic polymer cross-links with the epoxy resin to provide the resulting splice with high solvent resistance. High solvent resistance is important where the carbonized PAN tows and the included splice therebetween are to be subsequently treated with material containing a solvent. For example where the carbonized PAN tows are prepregged by being coated with a resin mixture in preparation for further processing, such resin mixture contains a solvent which might otherwise attack the bonding adhesive within the splice if such adhesive were not solvent resistant.

As shown by the examples described hereafter, the nature and quantity of the acrylic polymer can determine not only the strength but also the flexibility of the splice. The epoxy resin also plays an important role in determining the strength and flexibility of the splice. The acrylic polymer and the epoxy resin cross-link to provide high solvent resistance.

The acrylic polymer in the present example is comprised of a mixture of a first acrylic polymer having a relatively high molecular weight and being solid in form and a second acrylic polymer having a considerably lower molecular weight and being in the form of a liquid. Variations in the relative proportions of the first and second acrylic polymers have been found to provide variations in both the strength and the flexibility of the splices. In the present example the first or solid acrylic polymer is comprised of Carboset 525 which is manufactured by B. F. Goodrich Chemical Company and which has a molecular weight of 260,000. The second or liquid acrylic polymer comprises Carboset 515 which has a molecular weight of 7000 and which is manufactured by B. F. Goodrich Chemical Company. The epoxy resin in the present example comprises Epon 1031 which is a solid epoxy resin manufactured by Shell Chemical Company. It is the tetraglycidyl ether of tetraphenylethane. The solvent used in the present example is methylene chloride.

In a first experiment 40 grams of Carboset 525 and 10 grams of Epon 1031 were dissolved in 450 grams of methylene chloride to form the resin solution. The resulting solution was used to splice together two lengths of 12,000 filament Hi-Tex tows manufactured by Hitco, the assignee herein using the method of FIG. 1. The resulting splice proved to be relatively strong but was determined to be too stiff.

In a second experiment 30 grams of Carboset 525, 10 grams of Carboset 515 and 10 grams of Epon 1031 were dissolved in 450 grams of methylene chloride. The resulting resin solution was again used to splice together two different lengths of Hi-Tex tows using the method of FIG. 1. The resulting splice was strong enough, and proved to be more flexible than in the first experiment.

In a third experiment 25 grams of Carboset 525, 15 grams of Carboset 515 and 10 grams of Epon 1031 were dissolved in 450 grams of methylene chloride. Again the resulting resin solution was used to splice Hi-Tex tows using the method of FIG. 1. The resulting splice was strong enough and proved to be even more flexible than in the second experiment.

A number of additional experiments were performed in an effort to determine an optimum resin solution. The resin solution which proved to provide the best results was provided by mixing 23.9 grams of Carboset 525, 18.6 grams of Carboset 515 and 7.5 grams of Epon 1031 in 450 grams of methylene chloride.

A further experiment was performed in which the Epon 1031 solid epoxy resin was omitted. In that experiment 28.1 grams of Carboset 525 and 21.9 grams of Carboset 515 were dissolved in 450 grams of methylene chloride. When the resin solution was applied to Hi-Tex tows in accordance with the method of FIG. 1, the resulting splice was found to have marginal strength.

Ten different splices were made and tested using the preferred resin solution consisting of 23.9 grams of Carboset 525, 18.6 grams of Carboset 515, 7.5 grams of Epon 1031 and 450 grams of methylene chloride in conjunction with the method of FIG. 1. The splices were formed using 12,000 filament Hi-Tex tows manufactured by the assignee Hitco. The ten splices were tested and determined to have breaking strengths of 20–30 pounds. A 10 pound breaking strength is considered adequate for normal processing of the carbonized PAN tows. The splices had a suitable degree of flexibility as well as solvent resistance when used in a prepregging operation.

While the invention has been particularly shown and described with reference to a preferred embodiment thereof, it will be understood by those skilled in the art that various changes in form and details may be made therein without departing from the spirit and scope of the invention.

What is claimed is:

1. A solution for splicing together lengths of carbonized polyacrylonitrile material consisting of an acrylic polymer, an epoxy resin and a solvent, the acrylic polymer consisting of a solid acrylic polymer having a first molecular weight and a liquid acrylic polymer having a second molecular weight substantially less than the first molecular weight, the solution forming a relatively strong and flexible adhesive bond upon curing by heating.

2. The invention set forth in claim 1, wherein the epoxy resin consists of a solid epoxy resin.

3. The invention set forth in claim 2, wherein the solid acrylic polymer has a first molecular weight of about 260,000, the liquid acrylic polymer has a second molecular weight of about 7,000, the solid epoxy resin comprises the tetraglycidyl ether of tetraphenylethane, and the solvent comprises methylene chloride.

4. The invention set forth in claim 2, wherein the solution consists of approximately 47.8 parts by weight of solid acrylic polymer, approximately 37.2 parts by weight of liquid acrylic polymer, approximately 15.0 parts by weight of solid epoxy resin and approximately 900 parts by weight of solvent.

* * * * *